US009679306B2

(12) United States Patent
Virkar et al.

(10) Patent No.: US 9,679,306 B2
(45) Date of Patent: Jun. 13, 2017

(54) LIVE ADVERTISEMENT PREVIEW DISPLAY AND DISTRIBUTION

(75) Inventors: Ameya Virkar, Santa Clara, CA (US); Dean Quan, Millbrae, CA (US); Tarun Bansal, Santa Clara, CA (US); Joe Stampleman, San Carlos, CA (US); Ulises Robles, Sunnyvale, CA (US); Andy Hwu, San Jose, CA (US); Geoffrey Perez, San Jose, CA (US); Naga Viswanathan Malepati, San Marcos, CA (US); Vibha Bamba, San Francisco, CA (US); Ian Lin, Foster City, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 92 days.

(21) Appl. No.: 13/294,748

(22) Filed: Nov. 11, 2011

(65) Prior Publication Data

US 2013/0124342 A1 May 16, 2013

(51) Int. Cl.
*G06Q 30/00* (2012.01)
*G06Q 30/02* (2012.01)

(52) U.S. Cl.
CPC .................. *G06Q 30/0241* (2013.01)

(58) Field of Classification Search
CPC ............................................ G06Q 10/00–50/00
USPC ....................... 705/7.11–7.42, 14.1–14.73
See application file for complete search history.

(56) References Cited

U.S. PATENT DOCUMENTS

| | | | |
|---|---|---|---|
| 6,487,538 B1* | 11/2002 | Gupta et al. ............... | 705/14.66 |
| 6,629,135 B1* | 9/2003 | Ross et al. .................... | 709/218 |
| 6,907,566 B1* | 6/2005 | McElfresh ............. | G06Q 30/02 705/14.43 |
| 6,910,049 B2* | 6/2005 | Fenton ................ | G06F 17/3089 |
| 6,993,572 B2* | 1/2006 | Ross, Jr. ............ | G06Q 30/0274 709/218 |
| 7,031,968 B2* | 4/2006 | Kremer et al. ............... | 707/706 |
| 7,111,229 B2* | 9/2006 | Nicholas ............... | G06F 17/212 715/209 |
| 7,143,111 B2* | 11/2006 | Yamada .................. | G06F 17/24 |
| 7,240,077 B1* | 7/2007 | Edelman et al. | |
| 7,268,896 B2* | 9/2007 | Bellagamba .......... | G06F 3/1205 358/1.12 |
| 7,624,342 B2* | 11/2009 | Matveyenko et al. ........ | 715/255 |
| 7,668,913 B1* | 2/2010 | Underwood et al. ......... | 709/205 |
| 7,822,636 B1* | 10/2010 | Ferber .................... | G06Q 30/02 705/14.4 |
| 7,895,293 B1* | 2/2011 | Vasilik .......................... | 709/218 |

(Continued)

OTHER PUBLICATIONS

"4 Ways to Create a Test Version of Your Website" (www.whoishostingthis.com/blog/2011/02/10/launch-test-version-site/).*

*Primary Examiner* — Alan S Miller
(74) *Attorney, Agent, or Firm* — Brinks Gilson & Lione (57) ABSTRACT

A live advertisement ("ad") preview may be used by an advertiser and/or publisher to ensure that an ad is displayed correctly and to maximize user interaction with the ad. The live ad preview may be provided before the general public has access to the ad. The live ad preview may include a display of the ad within a real-time version of a destination web page. The live ad preview of the ad in the destination web page may be distributed with a universal resource locator ("URL") that may be distributed externally.

20 Claims, 5 Drawing Sheets

(56) References Cited

U.S. PATENT DOCUMENTS

| | | | | |
|---|---|---|---|---|
| 8,103,626 B2* | 1/2012 | Sykes | G06F 17/3089 707/610 |
| 8,136,027 B2* | 3/2012 | Underwood | G06F 17/3089 715/202 |
| 8,165,915 B1* | 4/2012 | Lucash | G06Q 30/02 705/14.4 |
| 8,239,489 B1* | 8/2012 | Vasilik | G06Q 30/02 709/203 |
| 8,271,868 B2* | 9/2012 | Sinyagin et al. | 715/234 |
| 8,335,718 B2* | 12/2012 | Feldman et al. | 705/14.48 |
| 8,555,159 B1* | 10/2013 | Shmulevich et al. | 715/255 |
| 2001/0039510 A1* | 11/2001 | Galomb | 705/14 |
| 2002/0046244 A1* | 4/2002 | Bimson et al. | 709/205 |
| 2002/0103698 A1* | 8/2002 | Cantrell | G06Q 30/02 705/14.55 |
| 2002/0188635 A1* | 12/2002 | Larson | G06Q 30/02 715/209 |
| 2002/0194194 A1* | 12/2002 | Fenton et al. | 707/104.1 |
| 2003/0014415 A1* | 1/2003 | Weiss et al. | 707/10 |
| 2003/0023632 A1* | 1/2003 | Ries et al. | 707/513 |
| 2003/0046152 A1* | 3/2003 | Colas | G06Q 30/02 705/14.49 |
| 2003/0051027 A1* | 3/2003 | Aupperle et al. | 709/224 |
| 2004/0019634 A1* | 1/2004 | Van Geldern et al. | 709/203 |
| 2004/0215719 A1* | 10/2004 | Altshuler | 709/204 |
| 2005/0022128 A1* | 1/2005 | Nicholas et al. | 715/731 |
| 2005/0149549 A1* | 7/2005 | Jaspers et al. | 707/102 |
| 2006/0129973 A1* | 6/2006 | Newcorn | G06F 17/211 717/106 |
| 2006/0200751 A1* | 9/2006 | Underwood et al. | 715/501.1 |
| 2007/0025723 A1* | 2/2007 | Baudisch | G03B 13/02 396/287 |
| 2007/0050251 A1* | 3/2007 | Jain et al. | 705/14 |
| 2007/0050252 A1* | 3/2007 | Jain | 705/14 |
| 2007/0050253 A1* | 3/2007 | Biggs et al. | 705/14 |
| 2007/0143181 A1* | 6/2007 | Linkner | G06Q 30/02 705/14.21 |
| 2007/0150353 A1* | 6/2007 | Krassner | G06Q 30/00 705/14.64 |
| 2007/0179892 A1* | 8/2007 | Chan et al. | 705/51 |
| 2007/0192192 A1* | 8/2007 | Haberman et al. | 705/14 |
| 2008/0103896 A1* | 5/2008 | Flake | G06Q 30/02 705/14.43 |
| 2008/0133336 A1* | 6/2008 | Altman | G06Q 30/0207 455/456.1 |
| 2008/0195957 A1* | 8/2008 | Kim | G06Q 30/02 715/762 |
| 2008/0235594 A1* | 9/2008 | Bhumkar | G06F 17/30991 715/738 |
| 2008/0275777 A1* | 11/2008 | Protheroe | G06Q 30/02 705/14.61 |
| 2008/0275980 A1* | 11/2008 | Hansen | 709/224 |
| 2009/0030859 A1* | 1/2009 | Buchs et al. | 706/19 |
| 2009/0031216 A1* | 1/2009 | Dressel | G06Q 30/02 715/255 |
| 2009/0070211 A1* | 3/2009 | Gonen | 705/14 |
| 2009/0076901 A1* | 3/2009 | Janos et al. | 705/14 |
| 2009/0119165 A1* | 5/2009 | Cotgreave | G06Q 30/0258 705/14.56 |
| 2009/0125372 A1* | 5/2009 | van Zwol | G06Q 30/02 705/14.41 |
| 2009/0125413 A1* | 5/2009 | Le Chevalier | G06Q 30/06 705/26.1 |
| 2009/0132507 A1* | 5/2009 | Kadambi | G06Q 30/02 |
| 2009/0197580 A1* | 8/2009 | Gupta | G06Q 30/02 455/414.2 |
| 2009/0300490 A1* | 12/2009 | Lejano et al. | 715/277 |
| 2009/0300496 A1* | 12/2009 | Fan et al. | 715/711 |
| 2009/0307085 A1* | 12/2009 | Lejano et al. | 705/14.49 |
| 2010/0049644 A1* | 2/2010 | Feldman et al. | 705/35 |
| 2010/0076863 A1* | 3/2010 | Golomb | 705/27 |
| 2010/0095197 A1* | 4/2010 | Klevenz et al. | 715/234 |
| 2010/0114823 A1* | 5/2010 | Sykes et al. | 707/626 |
| 2010/0146380 A1* | 6/2010 | Rousso et al. | 715/234 |
| 2010/0205562 A1* | 8/2010 | de Heer | 715/810 |
| 2010/0251095 A1* | 9/2010 | Juvet et al. | 715/234 |
| 2010/0293014 A1* | 11/2010 | Jain | G06F 17/30893 705/14.42 |
| 2011/0196748 A1* | 8/2011 | Caron | G06F 3/04847 705/14.72 |
| 2012/0278741 A1* | 11/2012 | Garrity | 715/760 |
| 2012/0310735 A1* | 12/2012 | Kniaz et al. | 705/14.49 |
| 2012/0324098 A1* | 12/2012 | De Jager et al. | 709/224 |
| 2013/0024283 A1* | 1/2013 | Axe | G06Q 30/02 705/14.54 |
| 2013/0097011 A1* | 4/2013 | Wang | G06Q 30/02 705/14.45 |

* cited by examiner

LIVE ADVERTISEMENT PREVIEW DISPLAY AND DISTRIBUTION

BACKGROUND

Online advertising may be an important source of revenue for enterprises engaged in electronic commerce. Processes associated with technologies such as Hypertext Markup Language (HTML) and Hypertext Transfer Protocol (HTTP) enable a web page to be configured to display advertisements. Advertisements may commonly be found on many web sites. Web site publishers, such as news and sports web sites, may provide space for advertisements. The publishers of these web sites may sell advertising space to advertisers to defray the costs associated with operating the web sites as well as to obtain additional revenue.

As the Internet has grown, the number and type of web sites available for hosting advertisements has increased. This increased diversity of publishers' web sites may result in different opportunities for advertisers, but may also necessitate increased review of advertisements by both publishers and advertisers to minimize interference with the original content of the page and maximize impressions and interactions with the displayed advertisements.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

By way of introduction, a live advertisement ("ad") preview may be used by an advertiser and/or publisher to ensure the ad is displayed correctly and to maximize user interaction with the ad. The live ad preview may be used by a publisher to verify that the ad does not interfere with the publisher's content on the web site, while also maximizing revenue generated for the publisher from the ads provided by the advertiser. The live ad preview may be available before the general public has access to the ad. The advertiser also would like to maximize user views and interactions (e.g. clicks or conversions) of the ad. The live ad preview may include a display of the ad within a real-time version of a destination web page. The live ad preview of the ad in the destination web page may be distributed with a universal resource locator ("URL") that may be distributed externally.

Advertisers and publishers may want to view an ad or ad campaign on a live destination web page and in the exact placement position in which it is to be displayed to visually validate that the ad is displayed and/or behaving correctly. The live preview may identify whether an ad within a page may improperly interact with existing content in the destination web page. For example, resizing the page window or maximizing the window should still result in a correct display of the ad. Likewise, the live ad preview may also illustrate the reactions for hovering over and/or clicking on the ad. The live ad preview may also be used to confirm there is no overlap between the ad and the content of the destination web page. For example, the ad may push down the destination web page content, such that the content is not hiding any part of the ad, but all of the content is displayed. The live ad preview may be used for rich media ads that are inherently more complex than standard graphical ads due to their complicated dynamic ad behaviors and page interactions. Rich media ads are usually associated with larger ad campaigns and the details may be important to the advertiser to ensure that the visual of the rich media ad is as expected.

The preview system and methods described below allow a publisher and/or advertiser to view a live ad preview within a destination page, which may be referred to as a destination web page. The live ad preview is displayed on a live or current version of the destination page to provide as accurate a preview as possible. Third parties may also be able to view the live ad preview through the sharing of an external URL that provides a display of the live ad preview over a network, such as the Internet. The live ad preview may be utilized in the development of an ad campaign for identifying ads to be included as part of that campaign. The live ad preview may be utilized in selecting which ads from an ad campaign are displayed on which pages.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Figure 1:
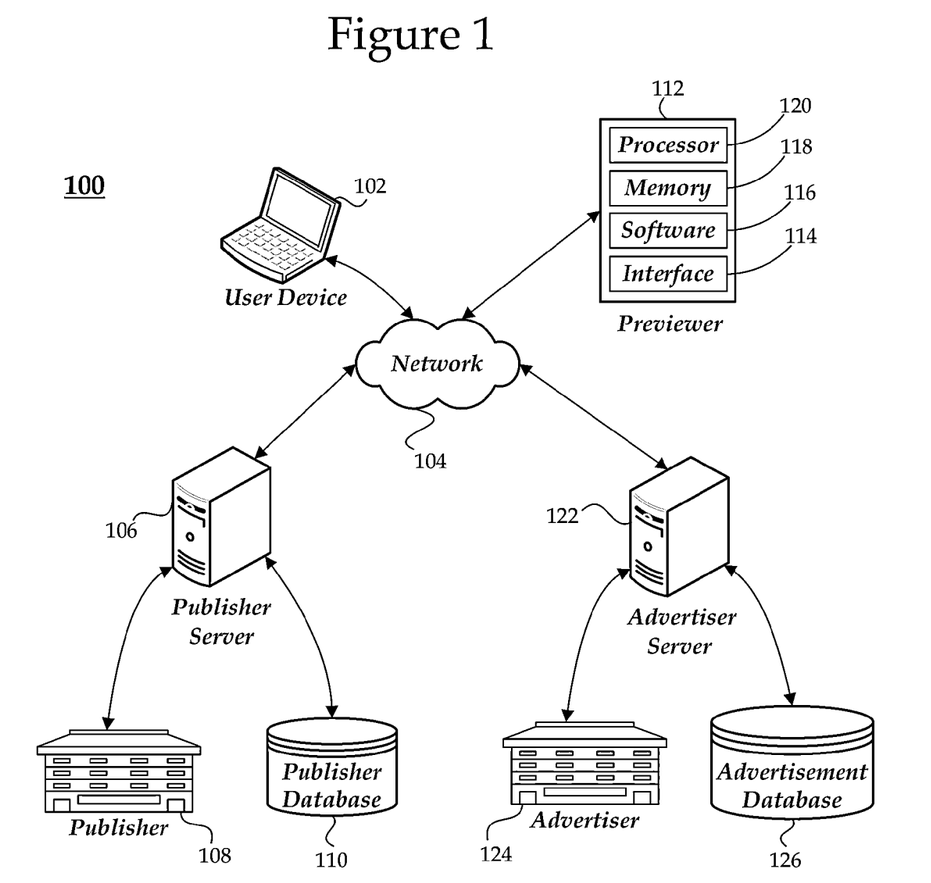
FIG. 1 is a diagram of an exemplary network system.

FIG. 1 depicts a block diagram illustrating one embodiment of an exemplary advertising system 100. The advertising system 100 may provide a platform for the live preview of advertisements in a destination web page. In the advertising system 100, a user device 102 is coupled with a publisher server 106 through a network 104. The publisher server 106 may be operated by and/or coupled with a publisher 108, as well as being coupled with a publisher database 110. An advertiser server 122 coupled with an advertiser 124 may also be coupled with an advertisement database 126. A previewer 112 may be coupled with the publisher server 106 and the advertiser server 122. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided. Accordingly, the previewer 112 may be coupled through a network (e.g. the network 104) with the publisher server 106 and the advertiser server 122.

The user device 102 may be a computing device which allows a user to connect to a network 104, such as the Internet. As described below, the user devicer 102 may be a third party user who views a live ad preview. In alternative embodiments, the user device 120 as described herein may be how the publisher and/or advertiser 124 views the live ad preview. Examples of a user device include, but are not limited to, a personal computer, personal digital assistant ("PDA"), a laptop, a smartphone, a cellular phone, a tablet, or other electronic device. The user device 102 may include a keyboard, keypad or a cursor control device, such as a mouse, or a joystick, touch screen display, remote control or any other device operative to view a live ad preview.

In one embodiment, the user device 102 is configured to request and receive information from a network (e.g. the network 104, which may be the Internet). The information may include web pages, such as the live ad preview that is displayed externally with a URL. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). The data displayed by the browser may include advertisements and there may be a live ad preview of the ads with the data. In an alternative embodiment, software programs other than web browsers may also display advertisements received over the network 104 or from a different source. As described below, the ads are displayed in a web page and the live ad preview is for an ad in a destination web page.

In one embodiment, the publisher server 106 provides an interface to a network 104 and/or provides its web pages over the network, such as to the user device 102. The publisher server 106 may be a web server that provides the user device 102 with pages (including advertisements) that are requested over the network, such as by a user of the user device 102. In particular, the publisher 108 may provide a web page, or a series of web pages that are provided by the publisher server 106 when requested from the user device 102. For example, the publisher may be a news organization, such as CNN® that provides all the pages and sites associated with www.cnn.com. Accordingly, when the user device 102 requests a page from www.cnn.com, that page is provide over the network 104 by the publisher server 106. As described below, that page may include advertising space or advertisement slots that are filled with advertisements viewed with the page. The publisher server 106 may be operated by a publisher 108 that maintains and oversees the operation of the publisher server 106.

The publisher 108 may be any operator of a page displaying advertisements that receives a payment from the advertisers of those advertisements. The publisher 108 may oversee the publisher server 106 by receiving advertisements from an advertiser server 122 that are displayed in pages (e.g. a destination web page) provided by the publisher server 106. In one embodiment, a previewer 112 may be used by the publisher 108 to view a preview of what a particular ad may look like on one its web pages.

The publisher database 110 may be coupled with the publisher server 106 and may store the publisher's pages or data that is provided by the publisher server 106. The pages that are stored may have ad slots for displaying advertisements. The publisher database 110 may include records or logs of at least a subset of the requests for data/pages and ads submitted to the publisher server 106. In one example, the publisher database 110 may include a history of Internet browsing data related to the pages provided by the publisher server 106. The publisher database 110 may store advertisements from a number of advertisers, such as the advertiser 124. In addition, the publisher database 110 may store records on the advertisements that are shown and the resulting impressions, clicks, and/or actions taken for those advertisements. The data related to advertisement impressions, clicks and resulting actions may be stored in either the publisher database 110 and/or an advertiser database 126.

The advertiser server 122 may provide advertisements for display in web pages, such as the publisher's pages. In one embodiment, the advertiser server 122 is coupled with the publisher server 106 for providing ads on the publisher's web pages. The advertiser 124 may be any operator of the advertiser server 122 for providing advertisements. The advertisements may relate to products and/or services provided by the advertiser 124. The advertiser 124 may pay the publisher 108 for advertising space on the publisher's page or pages. The advertiser 124 may oversee the advertiser server 122 by providing advertisements to the publisher server 106. The advertiser 124 may pay the publisher 108 for each impression, click, and/or conversion from the ads displayed on the publisher's pages.

The previewer 112 may provide a live preview of ad in a destination web page. In one embodiment, a live ad preview refers to a preview of an ad in a real-time or near real-time version of a web page. In other words, the ad is previewed in a live web page. However, the web page may not be live in the sense that the ad views, clicks, and conversions are not monitored and accounted for since the ad display is just a preview. Also, the web page preview with the ad may not be publicly accessible. In other words, the destination web page for which the live ad preview is created may not modify the actual destination web page. The live ad preview utilizes the current version of the destination web page for the preview.

The previewer 112 may create a URL for sharing the live ad preview externally as discussed below. The previewer 112 may be coupled with the publisher server 106 and the advertiser server 122 for generating a live ad preview of an ad from the advertiser server 122 in a destination web page from the publisher server 106. In one embodiment, the previewer 112 may be controlled by the publisher 108 and may be a part of the publisher server 106. Alternatively, the previewer 112 may be controlled by the advertiser 124 and may be a part of the advertiser server 122, or may be part of a separate entity.

The previewer 112 may receive advertisements from a number of different advertisers, such as the advertiser 124. Likewise, the previewer 112 may receive destination web pages from a number of different publishers, such as the publisher 108. The previewer 112 may be utilized by the different advertisers for testing different publishers' pages for displaying their ads. Likewise, the previewer 112 may be utilized by the different publishers for identifying advertisers' ads that display best on their pages.

The previewer 112 may be a computing device for generating the live ad preview. The previewer 112 may include a processor 120, memory 118, software 116 and an interface 114. The previewer 112 may be a separate component from the publisher server 106 and/or the advertiser server 122, or may be combined as a single component or device.

The interface 114 may communicate with any of the user device 102, the publisher server 106, and/or the advertiser server 122. The interface 114 may include a user interface configured to allow a user and/or administrator to interact with any of the components of the previewer 112. For example, the administrator and/or user may be able to configure the settings and features of the previewer 112.

The processor 120 in the previewer 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 120 is configured to execute the software 116. The software 116 may include instructions for generating a live ad preview.

The interface 114 may be a user input device or a display. The interface 114 may include a keyboard, keypad or a cursor control device, such as a mouse, or a joystick, touch screen display, remote control or any other device operative to interact with the previewer 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters. In particular, the interface 114 may allow a user to interact with the previewer 112 to view or modify the generation of a live ad preview.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the advertising system 100 may be coupled with one another through a network, including but not limited to the network 104. For example, the previewer 112 may be coupled with the publisher server 106 and/or the advertiser server 122 through a network. As another example, the advertiser database 126 may be coupled with the publisher server 106 and/or the previewer 112 through a network. Accordingly, any of the components in the advertising system 100 may include communication ports configured to connect with a network.

The network or networks that may connect any of the components in the advertising system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the ad server 122 or the publisher server 106 may provide advertisements and/or content to the user device 102 over a network, such as the network 104.

The publisher server 106, the publisher database 110, the previewer 112, the advertiser server 122, the advertiser database 126, and/or the user device 102 may represent computing devices of various kinds. Such computing devices may generally include any device that is configured to perform computation and that is capable of sending and receiving data communications by way of one or more wired and/or wireless communication interfaces, such as interface 114. For example, the user device 102 may be configured to execute a browser application that employs HTTP to request information, such as a web page, from the publisher server 106. The present disclosure contemplates the use of a computer-readable medium that includes instructions or receives and executes instructions responsive to a propagated signal, so that any device connected to a network can communicate voice, video, audio, images or any other data over a network.

Figure 2:
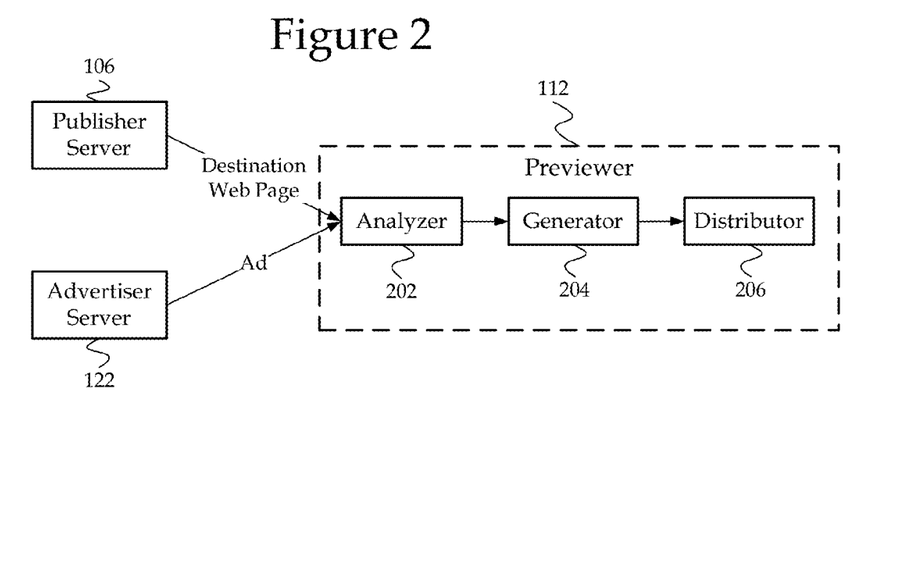
FIG. 2 is a diagram of an exemplary previewer.

FIG. 2 is a diagram of an exemplary previewer 112. The previewer 112 may receive a destination web page from the publisher server 106 and an ad from the advertiser server 122. The previewer 112 may include a receiver for receiving the ad and the destination web page. The destination web page may be entered as the page within which the ad is previewed. The live ad preview displays the received ad within a current version of the destination web page.

An analyzer 202 may analyze the ad and the destination web page to determine a fit for the ad on the destination web page. In one embodiment, the size of the ad may be matched with the size of available ad slots on the destination web page. Assuming a fit, the ad may be combined or inserted into the destination web page by the generator 204. The generator 204 may also be referred to as a combiner that combines the ad with the destination web page. The resulting combination is a live ad preview of the ad in the destination web page. The live ad preview may include an actual display of the ad within a live page. The in-page preview may be activated by selecting an ad for display and inputting a web address for a live web page. The ad is then displayed within the live web page for a live preview. The live preview may be displayed within a frame of the page, or may be displayed as a new window.

In alternative embodiments, multiple ads may be previewed for a single destination web page. The live ad preview may display each of the ads within the destination web page, which may be displayed through pagination on a single page. In alternative embodiments, there may be a button or option to change the ad or ads that are previewed on the destination web page to make it easier to view multiple ads within a single page.

The live ad preview from the generator 204 may be shared by the distributor 206. In particular, the distributor may generate a web address or a universal resource locator ("URL") that allows the live ad preview to be viewed externally. The URL may be emailed or otherwise transferred to allow for sharing of the live ad preview. The URL may be hosted by a different host than the publisher 108. The actual destination web page from the publisher may remain at its original web address, but another host may generate the live ad preview using the destination web page at a different URL. The live ad preview may not be active in that there is no accounting of ad impressions, clicks, and conversions since it is a preview. The sharing may be for an inactive, but real-time preview of an ad in the destination web page.

There may be multiple types of ads that provided to the previewer 112 from the advertiser server 122. The available ads may include image, audio, video, animated, or other rich media ads. The ads may utilize Adobe® Flash for displaying animations or other movement. A floating or hover ad may displayed that appears to be on top of the content of the destination web page. In other embodiments, the ads may be a storyboard ad that is part of an overall campaign that displays different ads in different places at different places to convey an overall theme or story. Storyboard ads may be a sequence or series of ads that are displayed. Likewise, companion ads may be included that are designed to be displayed together on a single page, but in different locations. For example, companion ads may include a banner ad and a side bar ad that are displayed at the same time and present the same or a similar message. Companion ads may be storyboard ads that are related.

Rich media ads may expand or contract as part of the visual display of the ad. For example, an ad may expand to partially and temporarily hover/float over another part of the destination web page. The live ad preview may illustrate where the ad may hover and for how long the hover lasts. Rich media ads may interact with or push the content. For example, a car ad may travel across the screen and crash into existing content. Testing of this rich media content may not work by just overlaying the ad on a page, but by generating a live ad preview that utilizes a current version of the page, the interaction of the ad with the content may be tested. The ads may include third party advertisements that may originate from a different advertising network or host. For example, the service that one publisher uses to display an ad may be different from another publisher, but the live ad preview may be universal in that it works regardless of which service a publisher uses for displaying ads.

Figure 3:
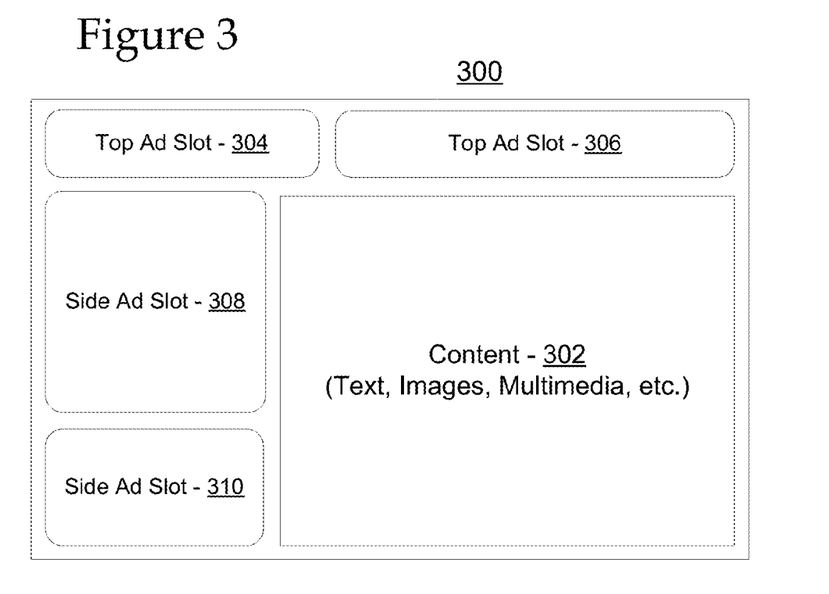
FIG. 3 is an exemplary page.
Figure 6:
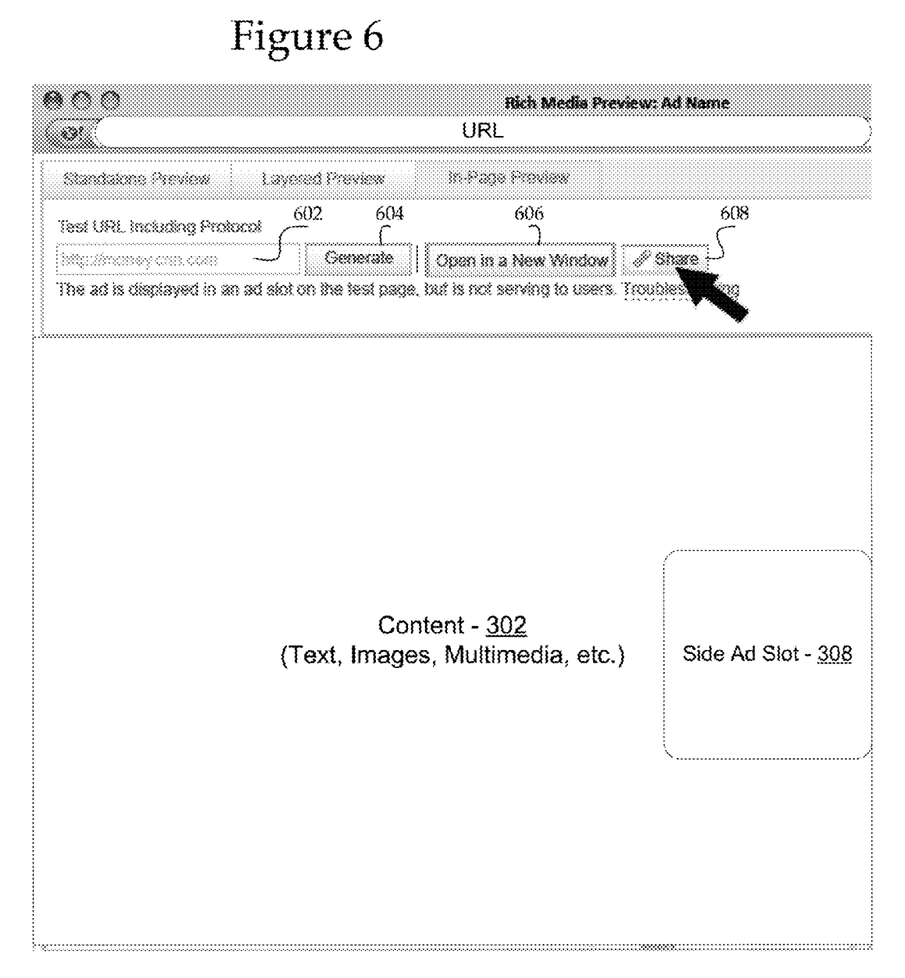
FIG. 6 is an exemplary screen shot for generating a preview.

FIG. 3 illustrates an example page, such as the destination page. The destination page may be a web page available via the Internet, or may be a page or screen from any software program. The content 302 may be displayed at or near the center of the page 300. Page 300 may include multiple advertisements ("ads") displayed around the main content 302. The content 302 that may be displayed may be an image, video, audio, other multimedia, text or any other visual display that may be included in a page. The live ad preview may illustrate one or more ads into the page 300 to verify that the ad displays properly and that the content is not hindered by the test ad. FIG. 6 illustrates an exemplary screen shot of the interface used for generating the live ad preview.

In one embodiment, there may be two top advertising slots 304, 306 for displaying advertisements at the top of the screen. The top advertising slots 304, 306 may each be of a particular size and require a particular size ad. The ad size may be measured by pixels. Additionally, there may be two side advertising slots 308, 310 displaying advertisement at the side of the screen. The side advertising slots 308, 310 may each be of a particular size and require a particular size ad. Ad slots may also be referred to as an advertising location or just an advertisement. FIG. 3 is merely exemplary of a screen or page displaying ads.

The ad slots may be of different sizes, such that the ad that is to be previewed may need to be analyzed and matched with at least one of the ad slots based on size. In one embodiment, if the ad size does not match an ad slot within the destination web page, an error message may be generated. The ad can be replaced or resized for the destination page or a different page may be selected. In the exemplary page 300, there are four available ad slots with four different sizes of ads. A preview of an ad that is the same size as one of those slots may only be previewed in the ad slot with the correct size. If there are multiple ad slots in a page of the same size, then an ad that matches that size may be previewed in each of the multiple ad slots.

In another embodiment, the orientation and location destination may also be compared. For example, the ad may be designed for either portrait or landscape viewing, so in addition to matching the size, the orientation may also need to be matched. Likewise, a particular rich media ad may only be designed for the left side of the screen, so the position or destination location may also need to be matched for the ad.

Figure 4:
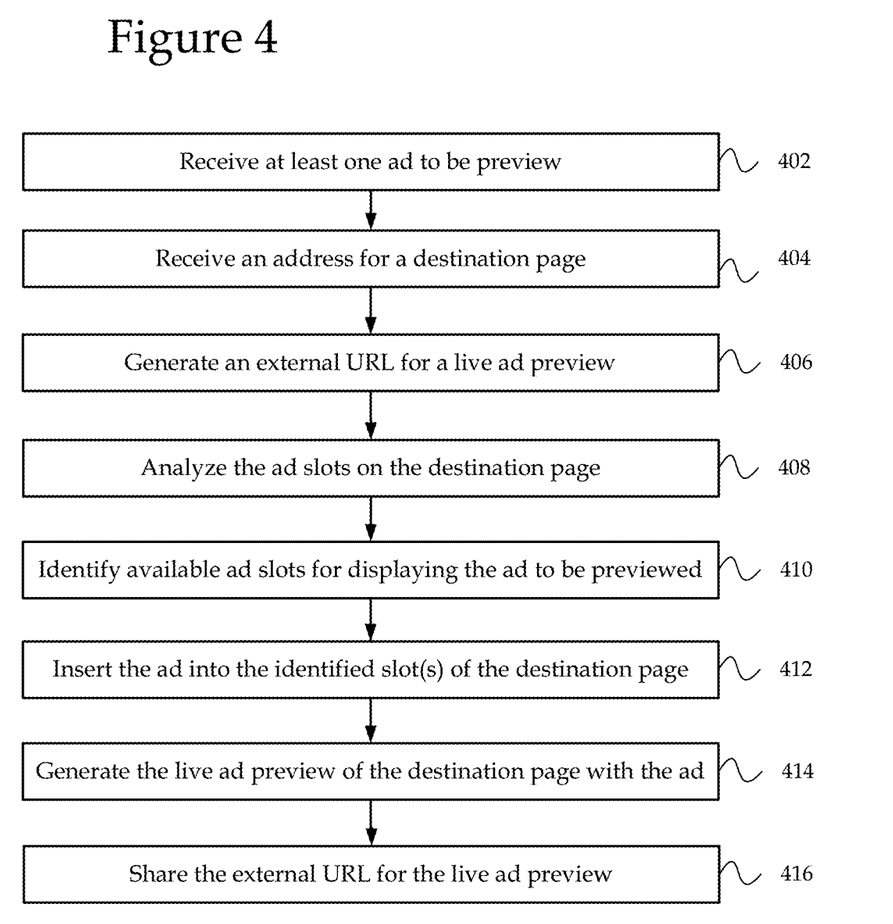
FIG. 4 is a flowchart of preview generation.

FIG. 4 is a flowchart of preview generation. The ad to be previewed is received in block 402. An address for the destination page is received in block 404. Once the instruction is received for generating a live ad preview using the received ad on the destination page, an external universal resource locator ("URL") address that identifies a location for the live ad preview is generated in block 406. FIG. 6 illustrates an exemplary screen shot where a user inputs the destination page address for generating the live ad preview. The available ad slots for the destination page may be analyzed in block 408. Appropriate ad slots on the destination page may be identified for the ad to be placed into for the preview in block 410. The analysis and identification may be based on size or may be based on the type of ad. The identified ad slot or slots in the destination page are then filled by the ad in block 412. A live ad preview is generated that shows the ad displayed in the identified ad slot of the destination page in block 414. The live ad preview may be shared through the distribution of the external URL for the live ad preview in block 416. The receipt of the URL and display of the live ad preview from the URL is described with respect to FIG. 5.

The live ad preview system may include a share function that allows external access to a live ad preview. Other users may be able to quickly and easily view a live ad preview externally. The share function of the live preview may generate an external URL that displays the ad within a live version of the destination web page. The URL may be hosted within another domain. For example, the URL may be www.adpreview.host.com/uniqueURL where the unique URL includes an identification of the ad to be displayed and the destination web page in which the ad is displayed. In another example, the destination URL may be encoded in the external URL along with the ad identification (ad-id): www.adpreview.host.com/uniqueURL&ad-id. The host may be the provider of the live preview software and/or the ad facilitator for connecting ads with publishers. For example, Yahoo! Inc. is one example of a host and may provide the live preview functionality.

Live ad preview may allow a user to enter any URL and receive a new URL that will allow them to preview the ads on the site of the provided URL. The new URL may be referred to as an external URL because it is a different URL than the provided or source URL. This URL may be available for any user for a configurable amount of time and may not require the viewer to be a user of the advertising system.

Although the preview may be live because it is shown within a live web page, it may not be publicly available or publicly displayed. In other words, if the live URL that is used is www.sports.yahoo.com, the live ad preview displays the ad within the current version of the page. However, other users going to www.sports.yahoo.com would not see the previewed ad and the page available to the public would be unchanged. The live preview allows for a more accurate preview of an ad on a particular page or pages.

The external URL may be encoded or formatted in many different ways in order to allow a third party to view a live preview of an ad by clicking on the external URL. The external URL may just identify the ad and the destination URL and the host can utilize that information for generating the live ad preview. The external URL may be encoded with a signature.

The signature may be encoded string of information that prevents tampering or changing of the URL from its original content and allows tracking for purposes of enforcing expiration dates. Information contained in the signature may include version, expiration date, ad identification, ad sizes, and/or vendor/publisher/advertiser identification.

The external URL may have an expiration date after which it becomes inactive and unavailable. For example, the external URL may be valid for up to one week. Attempts to access the external URL after the expiration time period may result in an error message that the ad preview that you have requested is no longer available. In one embodiment, as discussed below, a cookie may be used to further limit a time period for which an external user can view the live ad preview.

Figure 5:
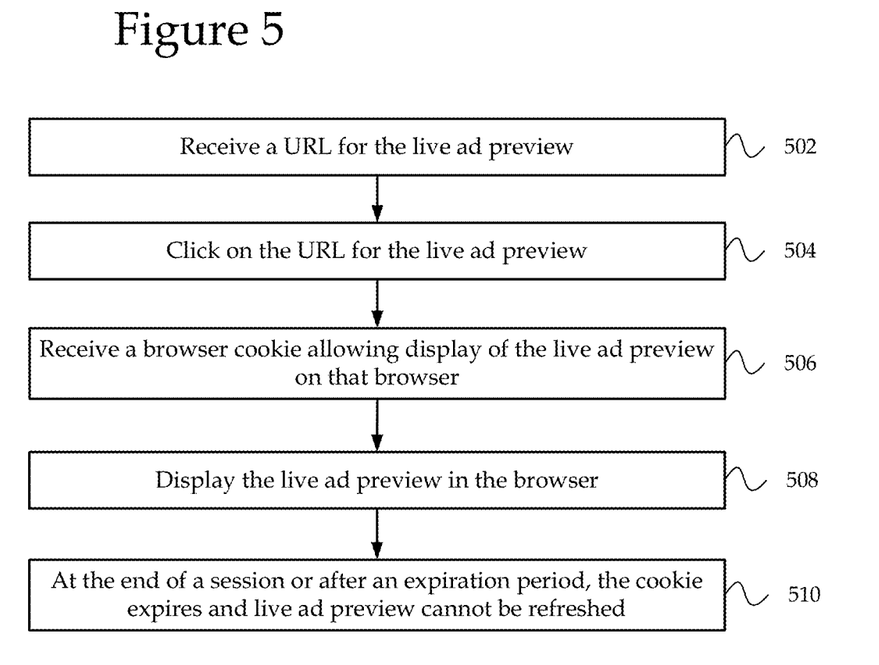
FIG. 5 is a flowchart for receiving a distributed preview.

FIG. 5 is a flowchart for receiving a distributed preview. The previewer generates a live ad preview that is accessible through an external URL as described above. The URL for the live ad preview may be received by a third party in block 502. In block 504, the URL is clicked on or activated for displaying the live ad preview. When an external URL is generated and distributed, a viewer of that URL may have a cookie that is automatically set as in block 506. The cookie may be used for the live preview of the ad. In one embodiment, the cookie expires in a short amount of time (e.g. one minute) so that the page cannot be refreshed. Since the page cannot be refreshed (after the cookie expiration) the viewer must click on the external URL again to invoke the preview. In addition, the cookie may automatically expire when the window/page the displays the live ad preview is closed. The live ad preview is displayed in the browser in block 508. In block 510, at the end of a session or after an expiration period, the cookie expires and live ad preview cannot be refreshed. In order for the third party to re-view the live ad preview a new external URL may need to be generated and received as in block 502. Before the URL has expired, the third party may be able to reactivate the external URL to view the live ad preview. However, once the URL expires, a new external URL may be needed to view the live ad preview.

FIG. 6 illustrates an exemplary screen shot for generating a live ad preview. The content 302 is illustrated with an ad slot 308 that is available for ad display. The content shown is from the test URL 602. The test URL 602 is the live page that is previewed with the ad. When the test URL 602 is entered, the generate button 604 previews the ad in a live or current version of the page located at the test URL 602. In particular, the activation of the generate button 604 may triggers steps 406-414 in FIG. 4. In one embodiment, the live ad preview may be displayed in a new window upon clicking the new window button 606. Activation of the new window button 606 may be similar to the generate button, but the live ad preview may be shown in a different window. The new window may also be a pop-up window for displaying the live ad preview. The share button 608 displays or provides an external URL that can be transmitted for allowing viewing of the live ad preview externally. As discussed, the external URL may have an expiration period after which it is no longer valid.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A system for advertisement preview comprising:
   a publisher server providing a destination page that includes at least one advertisement slot displaying at least one advertisement;
   an advertisement server providing an advertisement; and
   a previewer comprising:
      an analyzer that receives, from the publisher server, a location for the destination page and determines whether the advertisement, from the advertisement server, can be previewed in at least one of the advertisement slots on the destination page;
      a generator that generates a preview page that previews the destination page with the advertisement displayed in at least one of the advertisement slots on the destination page based on the analysis, wherein the preview page is hosted and accessible at a different location from the publisher server and from the destination page, and displays a live version of the destination page in real time; and
      a distributor that generates an indication of the location for the preview page that is different from the location of the destination page, wherein the distributor is configured to transmit the location of the preview page.

2. The system of claim 1 wherein the analyzer compares sizes of the at least one advertisement slots in the page with a size of the advertisement, and the preview page displays the advertisement in an ad slot that is a similar size as the size of the advertisement.

3. A computerized method for previewing an advertisement comprising:
   receiving an advertisement, from an advertiser server, to be previewed;
   receiving an address of a destination page in which the advertisement is to be previewed, wherein the advertisement is separate from the destination page;
   accessing the destination page, wherein the destination page comprises at least one advertisement slot;
   comparing, with at least one processor, the advertisement and the destination page to determine whether the advertisement can be previewed on the destination page;
   inserting the advertisement into at least one of the advertisement slots on a preview page that displays a preview of the destination page with the advertisement based on the comparison, wherein the preview page utilizes a current version of the destination page retrieved from the address of the destination page; and
   hosting the preview page at an address different from the address of the destination page, wherein accessing the address for the hosted preview page provides the preview page while accessing the address of the destination page provides the destination page.

4. The method of claim 3 wherein the received address of the destination page comprises a web address and the destination page comprises a web page.

5. The method of claim 4 wherein the accessing the destination page comprises retrieving the destination page from the web address.

6. The method of claim 3 wherein the hosted preview address is an external universal resource locator ("URL").

7. The method of claim 6 further comprising:
   sharing the external URL, wherein a recipient of the external URL can view the preview page.

8. The method of claim 7 wherein a viewing of the preview page from the external URL results in a preview of a current version of the destination page.

9. The method of claim 7 wherein the preview page is viewed by the recipient upon the recipient clicking on the external URL.

10. The method of claim 9 wherein a cookie is generated prior to the recipient viewing the preview page from the external URL.

11. The method of claim 10 wherein a cookie expiration may prevent an updating of the preview page and an updating of the destination page without another clicking of the external URL.

12. The method of claim 3 wherein the comparison of the advertisement and the destination page comprises a comparison of sizes of the at least one advertisements slot in the destination page with a size of the advertisement.

13. The method of claim 12 wherein the advertisement is inserted into the at least one of the advertisement slots that is a similar size as the size of the advertisement.

14. A computerized method for distributing an advertisement preview comprising:
   receiving an advertisement and a location for a destination page with at least one advertisement slot in which the advertisement is previewed;
   generating, with at least one processor, a preview page of a live version of the destination page with the advertisement in at least one of the at least one advertisement slot in the destination page;
   generating, with at least one processor, a location for the preview page that is different from the location for the destination page, wherein the live version of the destination page is provided from the location for the destination page while the preview page is provided from the location for the preview page; and
   sharing the location for the preview page to allow the preview page to be viewed upon accessing the location for the preview page and without accessing the destination page.

15. The method of claim 14 wherein the location comprises a web address and the destination page comprises a web page located at the web address.

16. The method of claim 15 wherein the location for the preview page comprises a web address that is different from the web address for the destination page.

17. The method of claim 16 wherein the web address for the preview page comprises a universal resource locator ("URL") and the sharing comprises distributing the URL for the location of the preview page.

18. The method of claim 14 wherein the generating of the preview page comprises:
- accessing the destination page in which the advertisement is to be previewed from the location for the destination page;
- comparing the advertisement and the destination page to determine whether the advertisement can be previewed on the destination page; and
- inserting the advertisement into at least one of the advertisement slots on the preview page of the destination page based on the comparison.

19. The method of claim 18 wherein the comparison of the advertisement and the destination page comprises a comparison of sizes of the at least one advertisement slots in the destination page with a size of the advertisement.

20. The method of claim 19 wherein the advertisement is inserted into the at least one of the advertisement slots that is a similar size as the size of the advertisement.

* * * * *